United States Patent
Ikeda et al.

(10) Patent No.: US 8,340,487 B2
(45) Date of Patent: Dec. 25, 2012

(54) RARE EARTH-DOPED CORE OPTICAL FIBER AND MANUFACTURING METHOD THEREOF

(75) Inventors: Masashi Ikeda, Sakura (JP); Naritoshi Yamada, Sakura (JP); Kuniharu Himeno, Sakura (JP); Michihiro Nakai, Sakura (JP); Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 319 days.

(21) Appl. No.: 12/109,612

(22) Filed: Apr. 25, 2008

(65) Prior Publication Data

US 2009/0317042 A1 Dec. 24, 2009

Related U.S. Application Data

(63) Continuation of application No. PCT/JP2006/321385, filed on Oct. 26, 2006.

(30) Foreign Application Priority Data

Oct. 26, 2005 (JP) ................................. 2005-311002

(51) Int. Cl.
*G02B 6/02* (2006.01)
*G02B 6/00* (2006.01)
(52) U.S. Cl. .......................... 385/123; 385/141; 385/142
(58) Field of Classification Search .................. 385/123, 385/141, 142
See application file for complete search history.

(56) References Cited

U.S. PATENT DOCUMENTS

| | | | |
|---|---|---|---|
| 6,154,598 A | 11/2000 | Gavrilovic et al. | |
| 7,280,728 B2 * | 10/2007 | Berkey et al. | 385/123 |
| 7,900,481 B2 * | 3/2011 | Gallagher et al. | 65/409 |
| 2002/0012378 A1 | 1/2002 | Zenteno | |
| 2002/0073739 A1 | 6/2002 | Zhang et al. | |
| 2004/0156401 A1 * | 8/2004 | Sandrock et al. | 372/6 |

FOREIGN PATENT DOCUMENTS

| | | |
|---|---|---|
| JP | 3-265537 A | 11/1991 |
| JP | 04-271329 A | 9/1992 |
| JP | 11-314935 A | 11/1999 |
| JP | 2000-191336 A | 7/2000 |
| JP | 2002-043660 A | 2/2002 |
| JP | 2002-534812 A | 10/2002 |
| JP | 2004-91261 A | 3/2004 |

(Continued)

OTHER PUBLICATIONS

"Photonic Frontiers: High-Power Fiber Lasers: Pumping up the power", Laser Focus World, 2005, PennWell, USA.

(Continued)

*Primary Examiner* — Uyen Chau N Le
*Assistant Examiner* — John M Bedtelyon
(74) *Attorney, Agent, or Firm* — Sughrue Mion, PLLC

(57) ABSTRACT

A rare earth-doped core optical fiber of the present invention includes a core comprising a silica glass containing at least aluminum and ytterbium, and a clad provided around the core and comprising a silica glass having a lower refraction index than that of the core, wherein the core has an aluminum concentration of 2% by mass or more, and ytterbium is doped into the core at such a concentration that the absorption band which appears around a wavelength of 976 nm in the absorption band by ytterbium contained in the core shows a peak absorption coefficient of 800 dB/m or less.

7 Claims, 10 Drawing Sheets

FOREIGN PATENT DOCUMENTS

| | | |
|---|---|---|
| JP | 2004-219890 A | 8/2004 |
| JP | 2005-84386 A | 3/2005 |
| JP | 2006-519495 A | 8/2006 |
| WO | 2004/070431 A2 | 8/2004 |

OTHER PUBLICATIONS

Z. Burshtein et al., "Impurity Local Phonon Nonradiative Quenching of $Yb^3+$ Fluorescence in Ytterbium-Doped Silicate Glasses", IEEE Journal of Quantum Electronics, Aug. 2000, pp. 1000-1007, vol. 36, No. 8, IEEE.

Kitabayashi, T. et., al. "Population Inversion Factor Dependence of Photodarkening of Yb-doped Fiber and Its Suppression by Highly Aluminum Doping", IEICE Technical Report, OFT2006-34, pp. 9-12, Oct. 2006, vol. 106, No. 286.

Koplow et al. ("Single-mode operation of a colled multitude fiber amplifier", Optics Letters, vol. 25, No. 7, Apr. 1, 2000).

Jeong ("Ytterbium-doped large-core fibre laser with 272 W output power", Electronics Letters, vol. 39 No. 13, Jun. 26, 2003).

Office Action issued by the United States Patent and Trademark Office in U.S. Appl. No. 12/837,109 dated Jul. 5, 2012.

\* cited by examiner

RARE EARTH-DOPED CORE OPTICAL FIBER AND MANUFACTURING METHOD THEREOF

TECHNICAL FIELD

The present invention relates to a rare earth-doped core optical fiber, and to a manufacturing method thereof. The rare earth-doped core optical fiber according to the present invention is used as a fiber for optical amplification of an optical fiber laser, an optical amplifier, etc. and is particularly suitable for the constitution of an optical fiber laser.

This application is a continuation application based on a PCT Patent Application No. PCT/JP2006/321385, filed Oct. 26, 2006, whose priority is claimed on Japanese Patent Application No. 2005-311002, filed on Oct. 26, 2005. The contents of both the PCT Application and the Japanese Application are incorporated herein by reference.

BACKGROUND ART

Recently, it has been reported that a single-mode optical fiber laser or optical amplifier, which employs an optical fiber doped with a rare earth element such as neodymium (Nd), erbium (Er), praseodymium (Pr), and ytterbium (Yb), as a laser active medium (hereinafter referred to as a rare earth-doped optical fiber,) has many possible applications in wide fields such as optical sensing or optical communication, and their applicability has been expected. One example of applications thereof is an Yb-doped core optical fiber laser employing an optical fiber in which a core is doped with Yb (which is hereinafter referred to as a Yb-doped core optical fiber), which is examined for the use in marker, repairing, soldering, cutting/drilling, welding for various materials or the like, and then commercialized. Conventionally, the laser used in such material processing applications has been mainly a YAG laser, but recently the requirements for the processing performance have become more stringent, and as a result, the needs of laser performance have increased. For example, 1. a smaller spot size is required in order to achieve high precision processing;
2. a higher output power is required; and
3. a reduction in down time for maintenance, etc. of a laser (such as MTBF, and MTBM) is required.

For these requirements, the Yb-doped core optical fiber laser is characterized in that it has 1. a spot size in a μm-order;
2. a several W through several kW output power; and
3. an expected life time of 30,000 or more, and the Yb-doped core optical fiber laser has a greater advantage when compared to a conventional YAG laser.

As the rare earth-doped core optical fiber, there is generally known an optical fiber obtained by using a rare earth-doped glass, as described in Patent Documents 1 and 2. The rare earth-doped glass is doped with a rare earth element, aluminum, and fluorine in a host glass comprising a $SiO_2$-based composition, and the rare earth-doped core optical fiber includes the glass as a core. Accordingly, the core part is doped with a rare earth element, aluminum, and fluorine.

If a $SiO_2$ glass or a $GeO_2$—$SiO_2$-based glass, used for common optical fibers, is doped with about 0.1% by mass or more of a rare earth element, there occurs a problem of a so-called concentration quenching. This is a phenomenon where rare earth ions are aggregated (clustered) with each other in the glass, whereby the energy of excited electrons is likely to be lost in a non-radial process, leading to a reduction of fluorescence life time or of fluorescence efficiency. Patent Document 1 describes that by doping both of the rare earth element and Al, a high concentration of the rare earth element can be doped without causing deterioration of the light emitting characteristics, and even with a lower interaction length with the pump light, a sufficient amplification gain is attained, thereby making it possible to realize a small-sized laser or optical amplifier.

Patent Document 2 describes a method for manufacturing a rare earth-doped core optical fiber, and in particular a rare earth-doped glass. In this method, a preform of a silica porous glass having an open pore connected therewith is immersed in a solution containing a rare earth ion and an aluminum ion, and the rare earth element and the aluminum are impregnated in the preform. Thereafter, a drying process is carried out, in which the preform is dried, the chloride of the rare earth element and the aluminum are deposited in the pores of the preform, and the deposited chloride is oxidized and stabilized. Then, the preform after the drying process is sintered for vitrification. Further, at a time between the completion of the drying process and the sintering process, the preform is subject to heat treatment under an atmosphere containing fluorine to dope the fluorine.

A rare earth-doped core optical fiber is obtained by synthesizing glass, as a clad portion, around the obtained rare earth-doped glass to obtain a glass preform for manufacturing of an optical fiber; and then fiber-drawing the preform. Herein, in order to obtain an optical fiber that is used for an Yb-doped core optical fiber laser, ytterbium (Yb) may be used as a rare earth element in the manufacturing process for the rare earth-doped glass.

An example of other methods for manufacturing an Yb-doped core optical fiber is a combination of a MCVD process and a solution process, as described in Non-Patent Document 1. In this method, $SiCl_4$, $GeCl_4$, $O_2$ gases, etc. are firstly flowed through a silica glass tube which is to be served as a clad glass, and a heat source such as an oxyhydrogen burner disposed outside the silica glass tube is used to oxidize $SiCl_4$ and $GeCl_4$ and to produce $SiO_2$ and $GeO_2$ glass soots, which are then deposited inside the silica glass tube. At this time, the temperature during deposition is kept to not give a completely transparent glass, thus obtaining a glass in a porous state. Next, a solution containing Yb ions is introduced into the inside of the silica glass tube having the prepared porous glass layer therein, and penetrated into the porous portion. After the sufficient penetration time with the solution, the solution is withdrawn from the silica glass tube, and the tube is dehydrated to remove water under a chlorine atmosphere. Then, the porous portion is made transparent, and core solidification is performed to prepare a preform for a Yb-doped core optical fiber. If necessary, the Yb-doped core optical fiber is obtained by synthesizing a glass, as a clad portion, around the prepared preform, thereby giving a transparent glass preform for preparation of an optical fiber; and then fiber-drawing the preform. Further, the obtained optical fiber can be used to constitute an Yb-doped core optical fiber laser.

FIG. 1 is a configuration diagram showing one example of the Yb-doped core optical fiber laser, in which the Yb-doped core optical fiber laser has a constitution comprising a Yb-doped core optical fiber 1, LD 2 as a pump light source connected to input the pump light from one end of the fiber, and optical fiber gratings 3 and 4 connected to both ends of the Yb-doped core optical fiber 1.

[Patent Document 1] Japanese Unexamined patent Application, First Publication No. 11-314935

[Patent Document 2] Japanese Unexamined Patent Application, First Publication No. 3-265537

[Non-Patent Document 1] Edited by Shoichi SUDO, Erbium-doped optical fiber amplifier, The Optronics Co., Ltd.
[Non-Patent Document 2] Laser Focus World Japan 2005. 8, p.p. 51-53, published by Co., Ltd. E-express
[Non-Patent Document 3] Z. Burshtein, et. al., "Impurity Local Phonon Nonradiative Quenching of Yb3+ Fluorescence in Ytterbium-Doped Silicate Glasses", IEEE Journal of Quantum Electronics, vol. 36, No. 8, Exit 2000, pp. 1000-1007

DISCLOSURE OF THE INVENTION

Problems to be Solved by the Invention

The present inventors have observed that when a conventional manufacturing method was used to prepare a Yb-doped core optical fiber to constitute the Yb-doped core optical fiber laser as shown in FIG. 1 to try a laser oscillation, the output power of the light at a laser oscillation wavelength of 1060 nm decreases over time, and as a result, the laser oscillation stops. Furthermore, the present inventors have also observed that this phenomenon also occurs in a commercially available Yb-doped core optical fiber from a manufacturer as an optical fiber for an optical fiber laser. For this reason, it has been proved that the conventional Yb-doped core optical fiber cannot endure over a long period of time. Non-Patent Document 2 shows that such a decrease in the output power of the laser oscillation light occurs due to a phenomenon called as 'photodarkening'. Furthermore, it is believed that the above-described phenomenon is a phenomenon in which the output power of the laser oscillation light is decreased, due to loss by the power of the pump light and the laser oscillation light caused by photodarkening.

The photodarkening phenomenon is one that clearly differs from the above-described concentration quenching. The concentration quenching is a phenomenon in which rare earth ions are aggregated (clustered) with each other in the glass, whereby the energy of excited electrons is likely to be lost in a non-radial process. Since there is usually no change in the aggregation state of the rare earth ions during the laser oscillation, the laser oscillation, even carried out over a long period of time, does not cause the change in the degree of concentration quenching and decrease in the output power of the laser oscillation over time. Patent Documents 1 and 2 in prior art may solve the concentration quenching on an optical fiber obtained by employing a rare earth-doped glass, but they cannot solve the problems on the decrease in the output power of the laser oscillation caused from a photodarkening phenomenon.

Under these circumstances, the present invention has been made, and an object of which is to provide a rare earth-doped core optical fiber that can be used to prepare an optical fiber laser capable of maintaining a sufficient output power of laser oscillation, even carried out over a long period of time, and a manufacturing method thereof.

Means to Solve the Problems

In order to accomplish the object, the present invention provides a rare earth-doped core optical fiber, which includes a core comprising a silica glass containing at least aluminum and ytterbium, and a clad provided around the core and comprising a silica glass having a lower refraction index than that of the core, wherein aluminum and ytterbium are doped into the core such that a loss increase by photodarkening, $T_{PD}$, satisfies the following inequality (A):

$$T_{PD} \geq 10^{\{-0.655*(D_{Al})-4.304*\exp\{-0.00343*(A_{Yb})\}+1.274\}} \quad (A)$$

[in inequality (A), TPD represents an allowable loss increase by photodarkening at a wavelength of 810 nm (unit: dB), $D_{Al}$ represents the concentration of aluminum contained in the core (unit: % by mass), and $A_{Yb}$ represents the peak absorption coefficient of the absorption band which appears around a wavelength of 976 nm in the absorption band by ytterbium contained in the core (unit: dB/m)].

Furthermore, the present invention provides a rare earth-doped core optical fiber, which comprises a core comprising a silica glass containing aluminum and ytterbium, and a clad provided around the core and comprising a silica glass having a lower refraction index than that of the core, wherein the core has an aluminum concentration of 2% by mass or more, and ytterbium is doped into the core at such a concentration that the absorption band of ytterbium doped into the core, which appears around a wavelength of 976 nm, shows a peak absorption coefficient of 800 dB/m or less.

In the rare earth-doped core optical fiber of the present invention, it is preferable that the core also contains fluorine.

In the rare earth-doped core optical fiber of the present invention, it is preferable that a polymer layer having a lower refraction index than that of the clad is provided on the periphery of the clad.

In the rare earth-doped core optical fiber, it is preferable that the clad is composed of an inner clad positioned on the exterior of the core, and an outer clad positioned outside the inner clad, and that the refractive index n1 of the core, the refractive index n2 of the inner clad, the refractive index n3 of the outer clad, and the refractive index n4 of the polymer layer satisfy the relationship of n1>n2>n3>n4.

In the rare earth-doped core optical fiber of the present invention, air holes may be present in a part of the clad glass.

Furthermore, the present invention provides a manufacturing method of a rare earth-doped core optical fiber. The method includes a deposition step which includes introducing raw material gases composed of various kinds of a halide gas and an oxygen gas from a first cross-section of the glass tube having silica as a main component into a hollow portion of the glass tube, heating the glass tube by a heating means, subjecting the halide gas to oxidization to form a soot-like exit, depositing the soot-like exit on the inner surface of the glass tube, and sintering deposited soot-like exit to deposit the porous glass layer; a doping step which includes doping an additive into the porous glass layer of the inner surface of the glass tube after the deposition step; a transparentization step which includes heating the glass pipe to subject the porous glass layer to transparent glass after the doping step; a core solidification step which includes collapsing a hollow portion of the glass tube for core solidification to form a preform after the transparentization step; and a fiber-drawing step which includes fiber-drawing the optical fiber preform including the preform to obtain a rare earth-doped core optical fiber after the core solidification step, wherein the halide gas contains at least $SiCl_4$ and $AlCl_3$, the additive contains at least a rare earth element, and in either or both of the deposition step and the transparentization step, a fluoride gas is introduced from a first cross-section of the glass tube to a hollow portion of the glass tube.

In the manufacturing method of the present invention, it is preferable that the rare earth element used as the additive at least contains ytterbium.

In the manufacturing method of the present invention, it is preferable that the core of the obtained rare earth-doped core optical fiber has an aluminum concentration of 2% by mass or more, and ytterbium is doped into the core at such a concentration that the absorption band of ytterbium doped into the core which appears around a wavelength of 976 nm shows a peak absorption coefficient of 800 dB/m or less.

In the manufacturing method of the present invention, it is preferable that the method further comprises a step for forming a polymer layer having a lower refraction index than that of the clad on the periphery of the clad of the optical fiber in the fiber-drawing step.

In the manufacturing method of the present invention, it is preferable that the clad of the obtained rare earth-doped core optical fiber is composed of an inner clad positioned on the exterior of the core, and an outer clad positioned outside the inner clad, and the refractive index n1 of the core, the refractive index n2 of the inner clad, the refractive index n3 of the outer clad, and the refractive index n4 of the polymer layer satisfy the relationship of n1>n2>n3>n4.

Advantages of the Invention

As for the rare earth-doped core optical fiber of the present invention, when the rare earth-doped core optical fiber of the present invention is used for an optical fiber laser having ytterbium as a laser active medium, the laser oscillation, even carried out over a long period of time, only slightly decreases the output power of the light at a laser oscillation wavelength, and enables to manufacture an optical fiber laser capable of maintaining a sufficient output power of laser oscillation even with use over a long period of time.

By using the manufacturing method of the rare earth-doped core optical fiber of the present invention, a rare earth-doped core optical fiber that is capable of manufacturing an optical fiber laser capable of maintaining a sufficient output power of laser oscillation even with use over a long period of time can be efficiently manufactured.

REFERENCE NUMERALS

Figure 1:
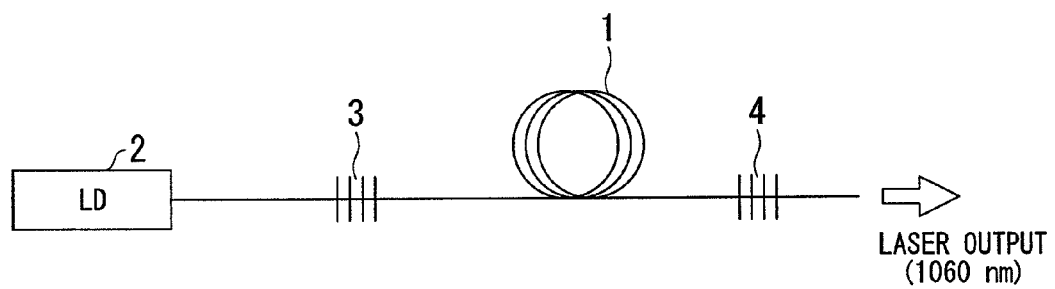
FIG. 1 is a block diagram showing one example of the optical fiber laser.

| | |
|---|---|
| 1: | Yb-doped core optical fiber, |
| 2: | Pump light source, |
| 3 and 4: | Optical fiber gratings, |
| 10B to 10E: | Rare earth-doped core optical fibers, |
| 11B to 11E: | Cores, |
| 12B to 12D: | Clads, |
| 13: | Polymer layer, |
| 14: | Inner clad, |
| 15: | Outer clad, |
| 20: | Silica glass tube, |
| 21: | Porous glass layer, |
| 22: | Oxyhydrogen burner, |
| 23: | Aqueous solution, |
| 24: | Plug, |
| 25: | Transparent glass layer, |
| 26: | Core portion, |
| 27: | Clad glass layer, and |
| 28: | Preform. |

BEST MODE FOR CARRYING OUT THE INVENTION

According to Patent Documents 1 and 2, a rare earth-doped glass having a rare earth element, aluminum, and fluorine doped in a host glass having $SiO_2$-based composition, and a manufacturing method thereof are disclosed, wherein ytterbium (Yb) is used as a rare earth element, and further the Yb-doped glass is used in the core portion to make an Yb-doped core optical fiber, which can be also applied in prior art. However, Patent Documents 1 and 2 have a detailed description that erbium (Er) is chosen as a rare earth element, but have no description of ytterbium being chosen as a rare earth element. Furthermore, the technology as described in Patent Documents 1 and 2 is a means for solving a problem on concentration quenching of a rare earth element, and thus it cannot be applied to solve the problem of the decrease in the output power of the laser oscillation light over time by using an Yb-doped core optical fiber (photodarkening problem) in prior art. That is, it is known that since the energy level that relates in the laser oscillation of the ytterbium ion ($Yb^{3+}$) in the Yb-doped core optical fiber is only in two kinds of states, that is, a $^2F_{7/2}$ ground state and a $^2F_{5/2}$ excited state, very little concentration quenching occurs. Further, Non-Patent Document 3 describes that the ytterbium concentration upon generation of concentration quenching in the glass having neither aluminum nor fluorine doped thereinto is $5\times10^{20}$ $cm^{-3}$. The Yb-doped core optical fiber used in the optical fiber laser generally has such an ytterbium concentration that the absorption band which appears around a wavelength of 976 nm shows the peak absorption coefficient in a range of from 100 to 2000 dB/m. The ytterbium concentration, as determined through calculation using these values, $0.11\times10^{20}$ $cm^{-3}$ to $2.2\times10^{20}$ $cm^{-3}$, which is smaller than that upon generation of concentration quenching as described in Non-Patent Document 3. Therefore, it is believed that aluminum is not needed to inhibit the concentration quenching of ytterbium.

On the other hand, a method of doping aluminum into the Yb-doped core optical fiber, as described later, can be a means for solving the problem on the decrease in the output power of the laser oscillation light, but the amount of aluminum doped is even more than that required to inhibit concentration quenching. For example, the concentration quenching was not observed in the Yb-doped core optical fiber, in which the core has a fluorine concentration of 0.6% by mass and an aluminum concentration of 0.1% by mass, and ytterbium is doped at a concentration such that the absorption band which appears around a wavelength of 976 nm in the absorption band by ytterbium contained in the core shows the peak absorption coefficient of 1000 dB/m, but remarkable increase in the photodarkening loss was observed in the fiber. Further, the fluorescence life time was measured on several other Yb-doped core optical fibers, in which the core has a fluorine concentration of 0.6% by mass and an aluminum concentration of 0.1% by mass, and the absorption coefficient is in a range of from 200 dB/m to 1900 dB/m. The results are shown in Table 1.

TABLE 1

Fluorescence life span of Yb-doped core optical fiber

| Yb light absorption rate (dB/m) | Fluorescence life span (ms) |
|---|---|
| 200 | 0.8 |
| 600 | 0.8 |
| 1000 | 0.8 |
| 1400 | 0.8 |
| 1900 | 0.8 |

Regardless of the absorption coefficient, the fluorescence life time is a constant value, and accordingly, even if the absorption coefficient is in a range of from 200 dB/m to 1900 dB/m, the concentration quenching does not occur.

Patent Documents 1 and 2 as prior arts do not describe appropriate concentrations of ytterbium, aluminum, and fluorine, and thus it is difficult to solve a problem on the decrease in the output power of the laser oscillation light even using the Yb-doped core optical fiber in prior art.

On the other hand, in order to solve a problem on the decrease in the output power of the laser oscillation light, the rare earth-doped core optical fiber of the present invention is a rare earth-doped core optical fiber, which comprises a core comprising a silica glass containing aluminum and ytterbium, and a clad provided around the core and comprising a silica glass having a lower refraction index than that of the core, wherein a concentration of aluminum contained in the core, and the peak absorption coefficient of the absorption band which appears around a wavelength of 976 nm in the absorption band by ytterbium contained in the core, are adjusted, respectively, so as to obtain an allowable loss increase by photodarkening.

First Example of First Embodiment

A first example of the first embodiment of the rare earth-doped core optical fiber according to the present invention is described with reference to FIG. 2A. The rare earth-doped core optical fiber 10B in the present example is composed of a core 11B doped with a rare earth element and a clad 12B surrounding the core, having a lower refractive index than the core.

Figure 2A:
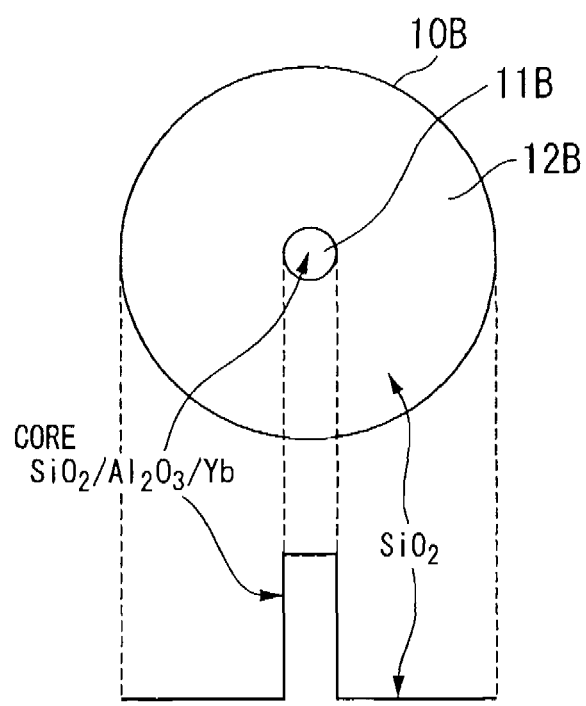
FIG. 2A is a schematic cross-sectional view showing a first example of a first embodiment of the rare earth-doped core optical fiber of the present invention.
Figure 3:
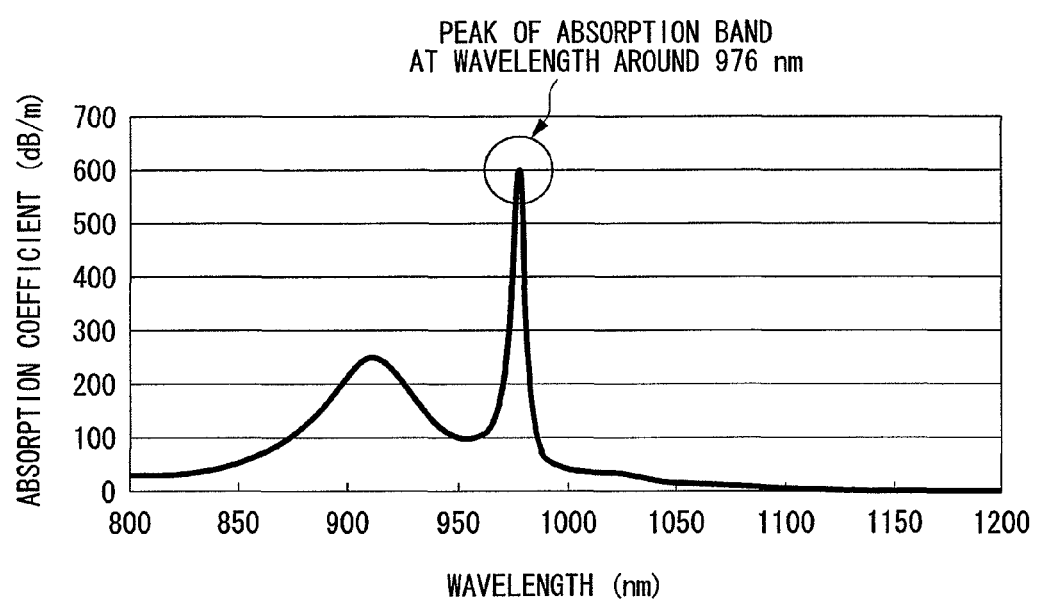
FIG. 3 is a graph showing the absorption spectrum by Yb of the Yb-doped core optical fiber of the present invention.

The rare earth-doped core optical fiber 10B shown in FIG. 2A has a core 11B comprising a silica glass containing aluminum (Al) and an ytterbium (Yb) that is a rare earth element, and a clad 12B comprising a silica ($SiO_2$) glass provided around the core. Furthermore, the core has an Al concentration of 2% by mass or more. In addition, Yb is contained in the core at a concentration such that the absorption band which appears around a wavelength of 976 nm shows the peak absorption coefficient 800 dB/m or less in the absorption by Yb contained in the core. FIG. 3 shows one example of the absorption spectrum by Yb of the rare earth-doped core optical fiber according to the present invention.

If an optical fiber laser is constituted by using a rare earth-doped core optical fiber having Yb doped into the core, an optical fiber laser providing an output power of a light as a laser oscillation wavelength of 1060 nm is obtained. However, an optical fiber laser using a conventional Yb-doped core optical fiber has a phenomenon that the output power of a light as a laser oscillation wavelength of 1060 nm is decreased over time, and as a result, laser oscillation stops.

On the other hand, for the optical fiber laser constituted by using the rare earth-doped core optical fiber of the present invention, the decrease rate of the output power of the light at a laser oscillation wavelength of 1060 nm can be significantly reduced even when laser oscillation is carried out over a long period of time. As the core has a higher Al concentration, the optical fiber laser has a lower decrease rate in the output power of the laser oscillation. Further, as the core has a higher Yb concentration, the optical fiber laser has a higher decrease rate in the output power of laser oscillation. As a result, by making the Al concentration of the core and the absorption coefficient by Yb of the rare earth-doped core optical fiber to suitable range described in the present invention, the decrease rate in the output power in the optical fiber laser can be significantly reduced.

Second Example of First Embodiment

The second example of the present embodiment of the rare earth-doped core optical fiber is described by way of specific examples. The rare earth-doped core optical fiber of the present example has substantially the same basic structure as that of the rare earth-doped core optical fiber shown in FIG. 2A, but it is a rare earth-doped core optical fiber which has the core 11B comprising a silica glass containing aluminum (Al) and ytterbium (Yb) as a rare earth element, in which aluminum and ytterbium are doped so as to satisfy the inequality (A), taking a concentration of aluminum contained in the core as $D_{Al}$ (unit: % by mass), and a peak absorption coefficient of the absorption band which appears around a wavelength of 976 nm in the absorption band by ytterbium contained in the core as $A_{Yb}$ (unit: dB/m).

In the inequality (A), $T_{PD}$ is an allowable loss increase by photodarkening at a wavelength of 810 nm in the Yb-doped core optical fiber, expressed in a unit of dB. The $T_{PD}$ is a value as determined when an optical fiber laser is designed using the Yb-doped core optical fiber of the present invention, and is a valued determined in consideration of various factors such as an acceptable value of the decrease rate of the output power of the optical fiber laser, a use environment, an intensity of the pump light source input to the Yb-doped core optical fiber, and a desired output power of laser oscillation. If $T_{PD}$ is set at a certain value, the loss increase by photodarkening of the Yb-doped core optical fiber of no more than $T_{PD}$ provides the optical fiber laser using the Yb-doped core optical fiber with good characteristics. To the contrary, the loss increase by photodarkening of the Yb-doped core optical fiber of more than $T_{PD}$ leads to unexpectedly higher decrease in the output power of the laser oscillation in the optical fiber laser using the Yb-doped core, and as a result, laser oscillation cannot be carried out over a long period of time.

From the right hand side of the inequality (A), by using two parameters: the concentration of aluminum contained in the core $D_{Al}$ (unit: % by mass) and the peak absorption coefficient of the absorption band which appears around a wavelength of 976 nm in the absorption band by ytterbium contained in the core $A_{Yb}$ (unit: dB/m), the loss increase by photodarkening of the Yb-doped core optical fiber can be estimated. However, the inequality (A) is an empirical inequality obtained from the data of the aluminum concentration, the absorption coefficient and the loss increase by photodarkening of a variety of the manufactured Yb-doped core optical fibers. A process for deriving the empirical inequality will be described later.

As in the present invention, as long as the rare earth-doped core optical fiber has the concentration of aluminum contained in the core and the peak absorption coefficient of the absorption band which appears around a wavelength of 976 nm in the absorption band by ytterbium contained in the core, which are each adjusted so as to obtain an allowable loss increase by photodarkening, the optical fiber laser using the rare earth-doped core optical fiber of the present invention, even with the ytterbium concentration varying in the Yb-doped core optical fiber, has good characteristics. Particularly,

- even when laser oscillation is carried out over a long period of time, most of the output power of the light at a laser oscillation wavelength is not decreased, and thus it is capable of maintaining a sufficient output power of laser oscillation even with use over a long period of time;
- even when the ytterbium concentration in the Yb-doped core optical fiber is high, decrease in the output power of the light at a laser oscillation wavelength can be maintained small;
- since the ytterbium concentration in the Yb-doped core optical fiber can be set high, the length of the fiber required for laser oscillation may be shorter, and by this, reduction in cost, inhibition of generation of noise light by a non-linear optical phenomenon, and the like can be attained; and
- other effects can be attained.

Third Example of First Embodiment

Figure 2B:
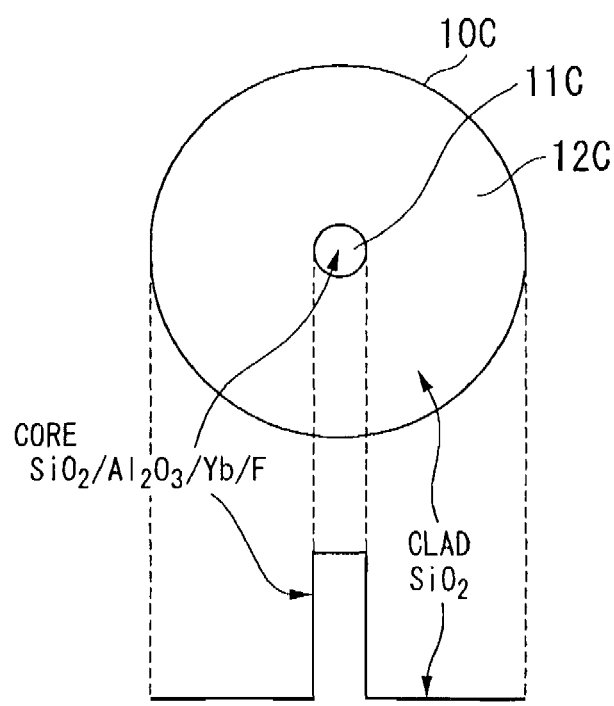
FIG. 2B is a schematic cross-sectional view showing a third example of a first embodiment of the rare earth-doped core optical fiber of the present invention.

FIG. 2B is a schematic view showing the third example of the first embodiment of the rare earth-doped core optical fiber 10C. This rare earth-doped core optical fiber 10C is composed of a core 11C comprising a silica glass containing Al, Yb as a rare earth element, fluorine (F), and a clad 12C comprising a silica glass provided around the core. In the case where Al is doped into the core portion, a higher Al concentration increases the refractive index of the core, thereby causing change in the optical characteristics such as the mode field diameter and the cut-off wavelength. However, in the present example, by doping fluorine into the core, it becomes possible to dope Al at a high concentration while maintaining refractive index of core or relative refractive index difference from the clad in a degree suited for an optical fiber, by compensating the increase in the refractive index resulting from the increased Al concentration only.

(Manufacturing Method of Rare Earth-Doped Core Optical Fiber of Present Invention)

FIGS. 4 and 5 are schematic views each showing one example of the manufacturing method of the rare earth-doped core optical fiber according to the present invention in the sequence in the process.

Figure 4A:
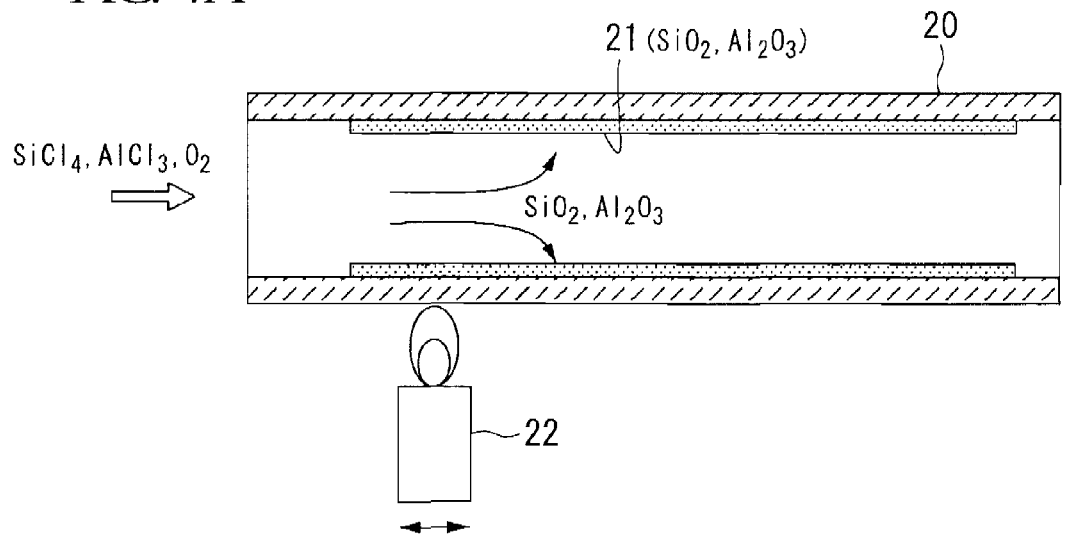
FIG. 4A is a schematic view showing one example of the manufacturing method of the rare earth-doped core optical fiber according to the present invention, and is a cross-sectional view showing the deposition step.

In the manufacturing method of the present invention, first, a deposition step as follows is carried out. A silica glass tube 20 having a suitable outer diameter and a suitable thickness is first prepared, and as shown in FIG. 4A, as halide gases, $SiCl_4$ and $AlCl_3$, and $O_2$ gases are transferred from a first cross-section the silica glass tube 20 to a hollow portion of the silica glass tube 20. Then, the silica glass tube 20 is heated by an oxyhydrogen burner 22 as a heating means, and $SiCl_4$ and $AlCl_3$ are oxidized to form a soot-like exit comprising $SiO_2$ and $Al_2O_3$, which is deposited on the inner surface of the silica glass tube 20. Then, the deposited soot-like exit is sintered, and a porous glass layer 21 is deposited.

Figure 5A:
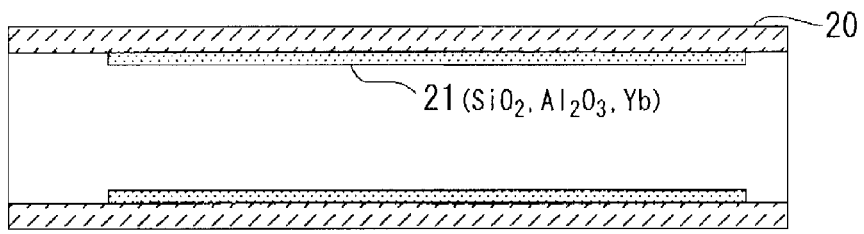
FIG. 5A is a schematic view showing one example of the manufacturing method of the rare earth-doped core optical fiber according to the present invention, and is a cross-sectional view showing the drying process.

Further, in the deposition step as shown in FIG. 4A, the raw material gases are $SiCl_4$, $AlCl_3$, and $O_2$ gases, additionally other halide gases, for example $GeCl_4$ may be appropriately used. If $GeCl_4$ is introduced, $GeO_2$ is produced as an exit. Further, for the purpose of lowering the refractive index of the core, $SiF_4$ may be used in the deposition step. Alternatively, $SiF_4$ is not used in the deposition step, but it may be only in the below-described transparentization step (FIG. 5C). Further, fluorine compounds other than $SiF_4$ (for example, $SF_6$, $CF_4$, and $C_2F_6$) may be used.

In the deposition step as shown in FIG. 4A, when a soot-like exit is produced and deposited on the inner surface of the silica glass tube 20, the process is performed while moving the oxyhydrogen burner 22 along the long axis of the silica glass tube 20 so as to uniformly deposit the exit on the silica glass tube 20. At this time, it is necessary to carefully control the heating temperature of the oxyhydrogen burner so that the deposited soot-like exit is burned and solidified to form a porous glass layer 21. If the temperature is too high, the porous glass layer 21 becomes a transparent glass, and as a result, the doping step cannot be carried out. Here, the heating temperature by the oxyhydrogen burner is as low as from a temperature providing a transparent glass to around 200 to 300° C. for solidifying the exit.

The reciprocation movement of the oxyhydrogen burner 22 is repeatedly carried out once or several times, to form a porous glass layer 21 containing $SiO_2$ and $Al_2O_3$.

Figure 4B:
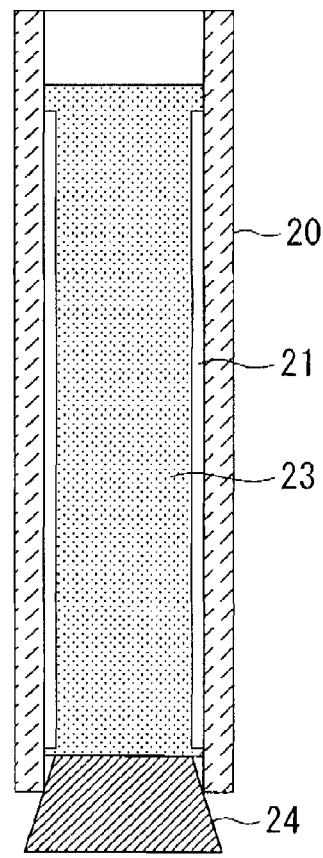
FIG. 4B is a schematic view showing one example of the manufacturing method of the rare earth-doped core optical fiber according to the present invention, and is a cross-sectional view showing the doping step.

Next, a doping step as follows is carried out. A raw material gas and the oxyhydrogen burner 22 are stopped and left to cool. Then, a plug 24 is positioned on one side of the silica glass tube 20 having the porous glass layer 21 formed on its inner surface, and the tube is stood with the plug 24 down side, and as shown in FIG. 4B, injecting an aqueous solution 23 containing a rare earth element compound from the other cross-section into the tube to penetrate the aqueous solution 23 into the porous glass layer 21, thereby doping the rare earth element into the aqueous solution to the porous glass layer 21.

The aqueous solution containing the rare earth element is selected according to the rare earth element doped into the core to the solution. In the manufacturing of the Yb-doped core optical fiber, it is preferable that the solute of the aqueous solution containing the rare earth element is $YbCl_3$, and the solvent is $H_2O$. In this case, the $YbCl_3$ concentration in the aqueous solution 23 is, for example, 0.1 to 5% by mass, and the solution concentration for obtaining a desired Yb concentration is empirically determined.

The porous glass layer 21 of the inner surface of the silica glass tube 20 is immersed in the aqueous solution containing the rare earth element compound for a suitable time, such as about 3 hours, and the plug 24 is detached. Then, the aqueous solution 23 is withdrawn from the tube, and as shown in FIG. 5A, the dried $O_2$ gas is transported into the silica glass tube 20 to evaporate the moisture. This drying process is carried out for 1 hour or longer, preferably about 6 hours.

Figure 5B:
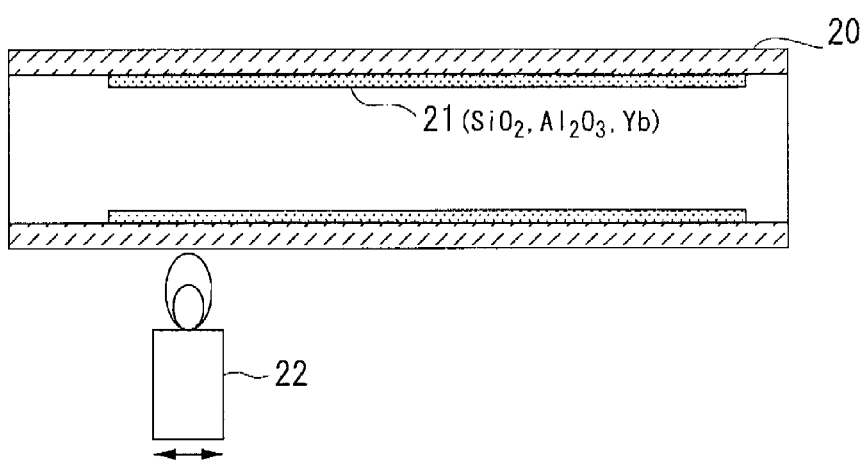
FIG. 5B is a schematic view showing one example of the manufacturing method of the rare earth-doped core optical fiber according to the present invention, and is a cross-sectional view showing the dehydration process.
Figure 5C:
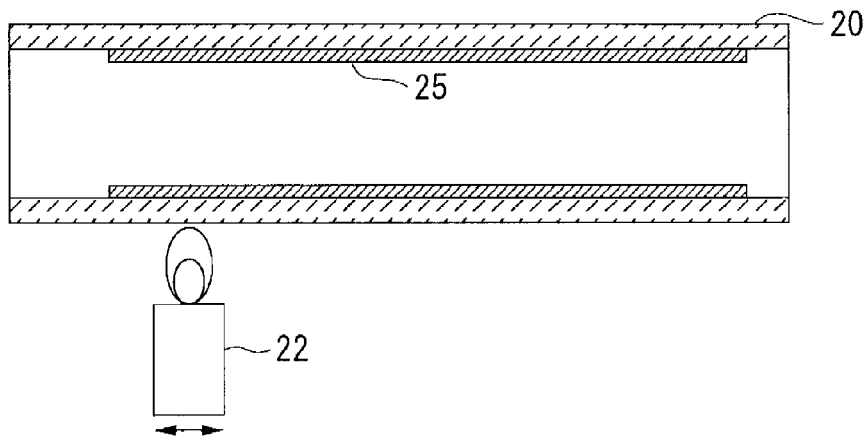
FIG. 5C is a schematic view showing one example of the manufacturing method of the rare earth-doped core optical fiber according to the present invention, and is a cross-sectional view showing the transparentization step.

In order to remove the remaining moisture, while $Cl_2$, $O_2$, and He gases are transported into the silica glass tube 20, the periphery of the silica glass tube 20 is heated by the oxyhydrogen burner 22 to sufficiently dehydrate the moisture (FIG. 5B). In this case, the operation is conducted at a heating temperature that is sufficiently low not to make the porous glass layer 21 transparent.

Thereafter, while $SiF_4$, He, and $O_2$ are transported into the silica glass tube 20, and the fire power of the oxyhydrogen burner 22 is raised to perform the process to make the porous glass layer 21 transparent (FIG. 5C). In this transparentization step, fluorine can be doped into the transparentized glass layer (transparent glass layer 25) by flowing $SiF_4$ as a fluorine compound thereinto. Further, as described above, $SiF_4$ may not be used in this transparentization step, but it may be used only in the deposition step. Furthermore, fluorine compounds other than $SiF_4$ (for example, $SF_6$, $CF_4$, and $C_2F_6$) may be used. By using either one, fluorine can be doped into the transparent glass layer 25.

Figure 5D:
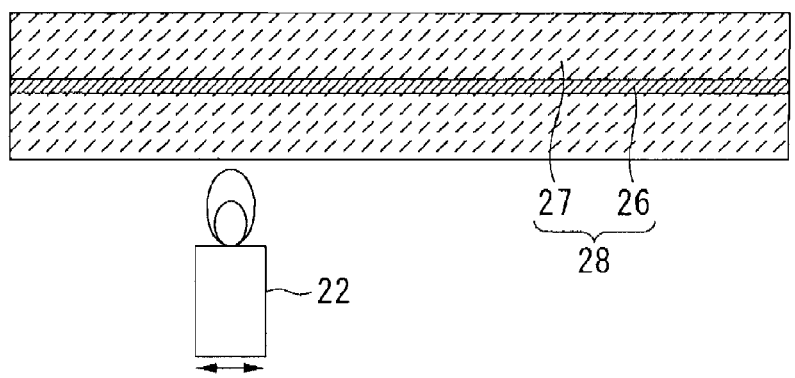
FIG. 5D is a schematic view showing one example of the manufacturing method of the rare earth-doped core optical fiber according to the present invention, and is a cross-sectional view showing the core solidification step.

Next, a core solidification step in which the fire power of the oxyhydrogen burner 22 is increased to carry out core solidification of the silica glass tube 20, to prepare a rod-like preform 28 is carried out (FIG. 5D). A core portion 26 containing a silica glass doped with Al, F, and Yb is positioned in the center of the preform 28, which corresponds to the core of the optical fiber obtained from the preform 28. The clad glass layer 27 formed by core solidification of the silica glass tube 20 is formed on the periphery of the core portion 26.

The silica tube that is an outer portion of the clad glass layer is covered on the outside of the prepared preform 28, and a jacket process for heating integration is carried out to prepare an optical fiber preform. The preform is drawn to obtain a rare earth-doped core optical fiber.

Further, a method for forming a clad glass layer is not limited to a method by the jacket process, and it may be an outside vapor phase deposition method.

By the above-described manufacturing method, Al can be uniformly contained in the porous glass layer 21 deposited on the inner surface of the silica glass tube 20. The present inventors have found out that when the prepared porous glass layer 21 is immersed in the aqueous solution 23 containing the rare earth element, the decrease in the output power of the optical fiber laser is suppressed, as compared to the case where Al is not contained in the production of a porous glass layer. Particularly, the present inventors have found out that in the case where the rare earth element is Yb, the optical fiber laser, constituted using the Yb-doped core optical fiber obtained by drawing the preform obtained by the manufacturing method of the present invention, does not decrease the output power of the light at a laser oscillation wavelength of 1060 nm, even when laser oscillation is carried out over a long period of time. Accordingly, the manufacturing method of the present invention, and the Yb-doped core optical fiber obtained by the manufacturing method of the Yb-doped core optical fiber, can be used to obtain an optical fiber laser capable of maintaining sufficient output power of laser oscillation even when used over a long period of time.

Second Embodiment

Figure 6:
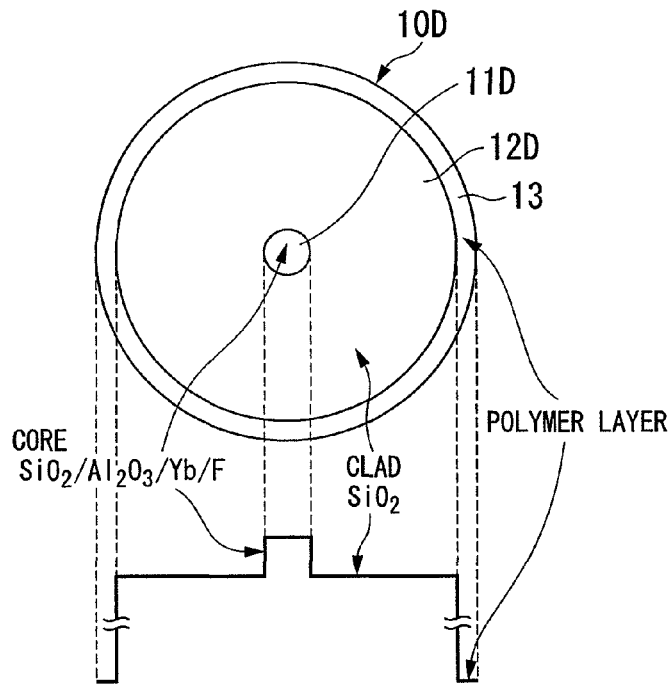
FIG. 6 is a schematic cross-sectional view showing a second embodiment of the rare earth-doped core optical fiber of the present invention.

FIG. 6 is a schematic view showing the second embodiment of the rare earth-doped core optical fiber according to the present invention. The rare earth-doped core optical fiber 10D of the present embodiment has a constitution provided with a polymer layer 13 having a lower refractive index than the dads 12B and 12C on the periphery of the dads 12B and 12C of the rare earth-doped core optical fibers 10B and 10C of the above-described first embodiment. The core 11D and the clad 12D in the rare earth-doped core optical fiber 10D of the present embodiment can have the same constitution as the cores 11B, 11C, and the dads 12B, 12C in the rare earth-doped core optical fibers 10B and 10C of the above-described first embodiment.

By using such a structure, the rare earth-doped core optical fiber of the present invention can be a double-clad fiber, and thus by inserting a higher power of the pump light, a higher output power of laser oscillation can be obtained. In a conventional rare earth-doped core optical fiber, a higher power of the pump light leads to more remarkable decrease in the output power of the laser oscillation, and it cannot be used as the double-clad fiber. On the other hand, the rare earth-doped core optical fiber of the present invention has a core having the same composition as described above, and if it is a double-clad fiber having the polymer layer 13 on the periphery of the clad 12D as shown in the present embodiment, it is possible to carry out laser oscillation over a long period of time.

Third Embodiment

Figure 7:
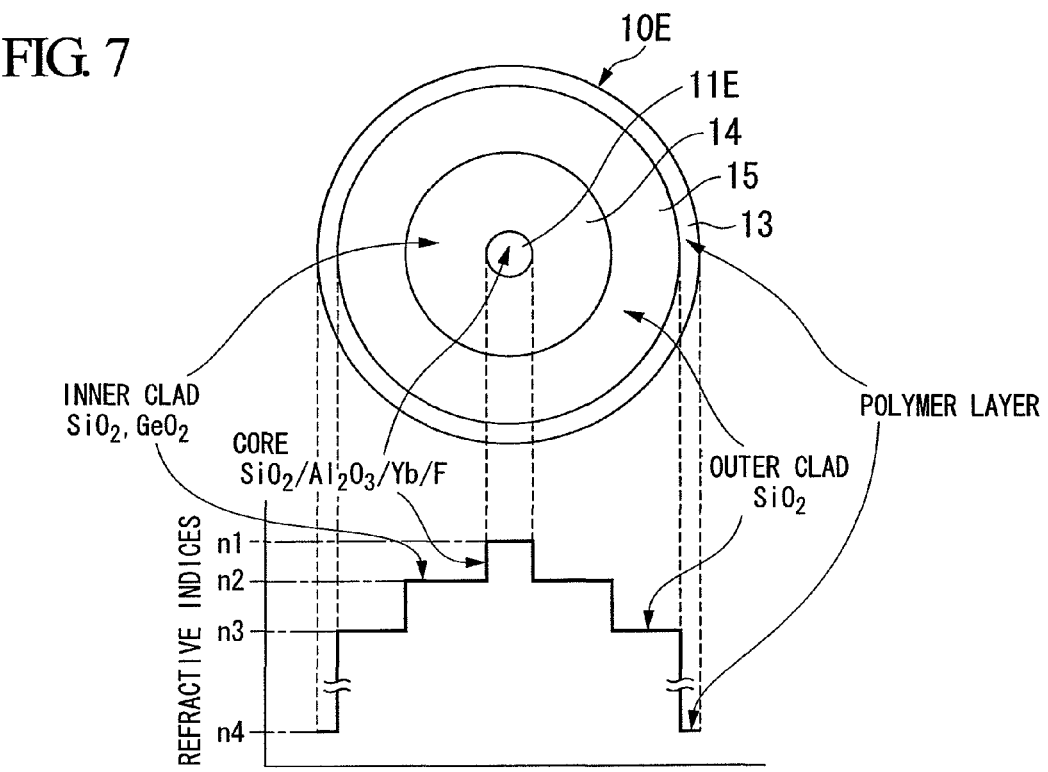
FIG. 7 is a schematic cross-sectional view showing a third embodiment of the rare earth-doped core optical fiber of the present invention.

FIG. 7 is a schematic view showing the third embodiment of the rare earth-doped core optical fiber according to the present invention. The rare earth-doped core optical fiber 10E of the present embodiment is composed of a core 11E, an inner clad 14 positioned on the exterior of the core 11E, an outer clad 15 positioned outside the inner clad 14, and a polymer layer 13 positioned outside the outer clad 15. The core 11E comprises a silica glass containing a rare earth element such as Al and Yb, and fluorine (F), the inner clad comprises a silica glass containing Ge, and the outer clad comprises a silica glass. This rare earth-doped core optical fiber 10E has a structure having a refractive index satisfying the relationship among the refractive index n1 of the core 11E, the refractive index n2 of the inner clad 14, the refractive index n3 of the outer clad, and the refractive index n4 of the polymer layer 13 of: n1>n2>n3>n4. That is, the present structure is a triple-clad structure comprising the clad composed of the inner clad 14, the outer clad 15, and the polymer layer 13.

By using such a structure, the difference in the refractive indices between the core 11E and the inner clad 14, nA (=n1−n2), can be smaller than the difference in the refractive indices between the core 11E and the outer clad 15, nB (=n1−n3). Accordingly, the effective area $A_{\mathit{eff}}$ can be larger of the light at a laser oscillation wavelength of 1060 nm, and thus generation of the noise light by a non-linear optical phenomenon such as Stimulated Raman Scattering, Stimulated Brillouin Scattering, and Four Wave Mixing can be reduced. In order to increase the effective area $A_{eff}$ by a conventional optical fiber, it is necessary to decrease the difference in the refractive indices between the core and the clad. Thus, the dopant such as Al and germanium should be reduced, but if the Al concentration is small, the decrease rate of the output power in the optical fiber laser is increased. The rare earth-doped core optical fiber 10E of the present embodiment can have the core 11E doped with a sufficient amount of Al, and the effective area $A_{eff}$ can be further increased. Further, the optical fiber laser using the rare earth-doped core optical fiber 10E of the present embodiment can have higher performance and higher quality.

In the rare earth-doped core optical fiber according to the present invention, even when air holes are provided in a part of the clad, a double-clad fiber can be obtained, in which laser oscillation is carried out over a long period of time. Furthermore, by optimization of the positions of the air holes, a higher NA, a reduced skew light, or the like can be attained.

EXAMPLES

Example 1

Using the Yb-doped core optical fiber having a structure as shown in FIG. 2A, a plurality of optical fibers having Al doped into the core different Yb concentrations were prepared. The clad outer diameter of the prepared Yb-doped core optical fiber was 125 μM, the core diameter was in a range of from 5 to 11 μm according to the Al concentrations, and the Al concentrations in the core were in four classes of 0% by mass, 1% by mass, 2% by mass, and 3% by mass, respectively. Furthermore, a plurality of these Yb-doped core optical fibers having different Yb concentrations were prepared, and the amount of the peak absorption coefficient is varied within a range of from 100 dB/m to 1500 dB/m in the absorption band which appears around a wavelength of 976 nm caused by the Yb.

Evaluation of the characteristics of decrease in the power of the laser oscillation light of the prepared Yb-doped core optical fiber was conducted with reference to "Measurement System of Photodarkening" in Non-Patent Document 2. As described above, it is thought that the decreased in the power of the laser oscillation light is caused from the loss increase by photodarkening. When the pump light at a wavelength of 976 nm is entered with a high power onto the Yb-doped core optical fiber, photodarkening occurs, thereby leading to loss. By measuring the loss at a certain wavelength after the pump light at a wavelength of 976 nm was entered for a certain period of time, the magnitude of the increase in the loss by photodarkening in the optical fiber to be measured can be measured, and it is related to the decrease rate of the light at a laser oscillation wavelength of 1060 nm. Accordingly, the characteristics of decrease in the power of laser oscillation light of the Yb-doped core optical fiber can be evaluated.

Figure 8:
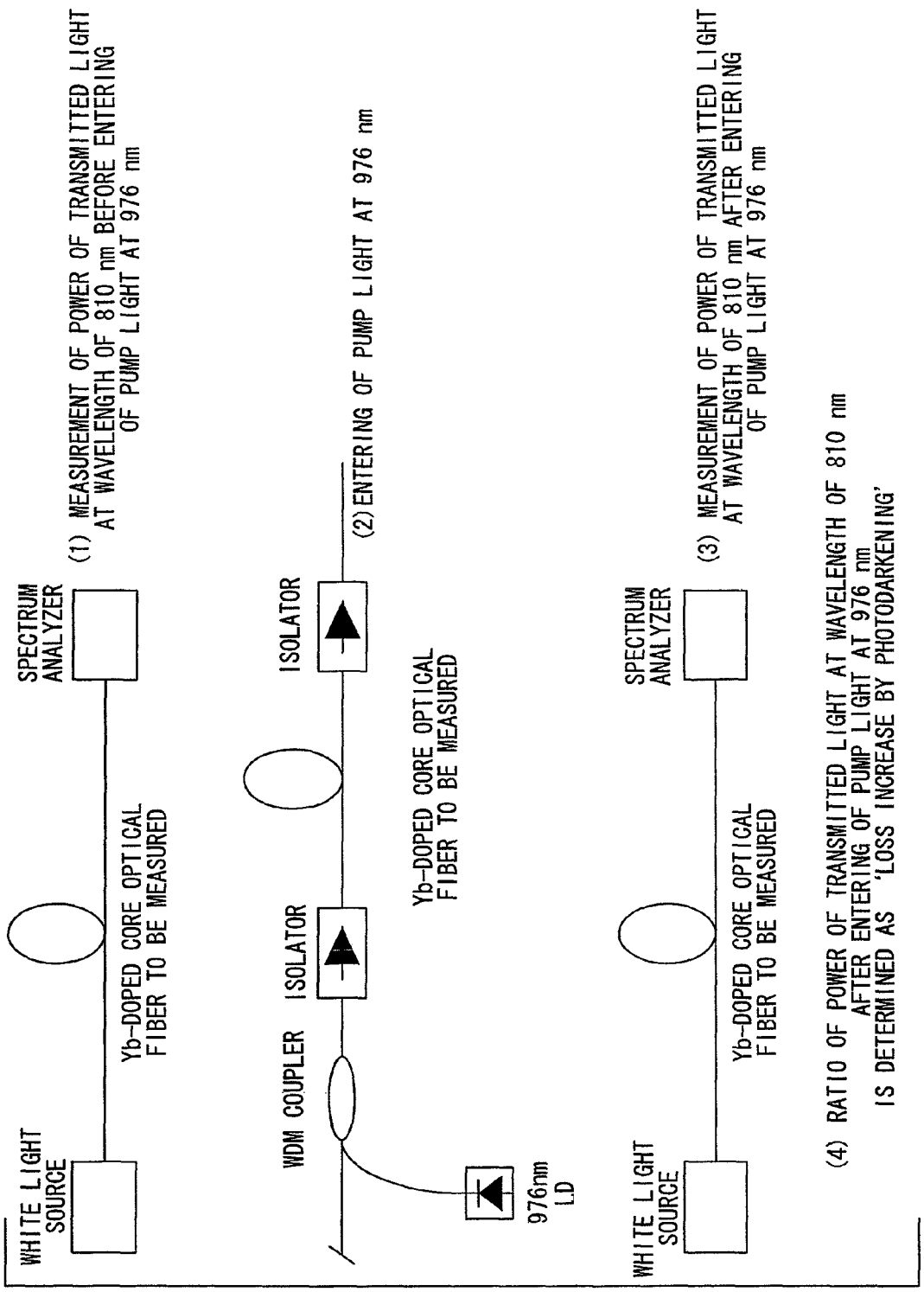
FIG. 8 is a block diagram showing the measurement sequence for measuring the loss increase by photodarkening used in the Examples.
Figure 9A:
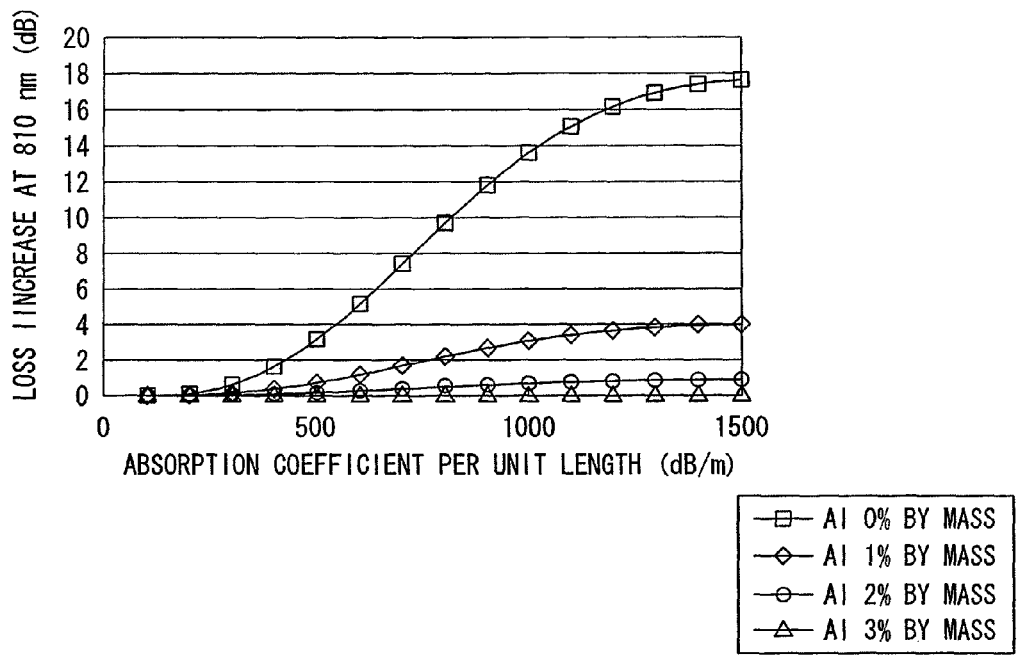
FIG. 9A is a graph showing the results of the loss increase by photodarkening as measured in Example 1.

The prepared Yb-doped core optical fiber was set in a measurement instrument for measuring the loss increase by photodarkening as shown in FIG. 8, and measured. Here, the length of a sample was adjusted under a measurement condition that the peak absorption coefficient of the optical fiber to be measured at a wavelength of around 976 nm (unit: dB/m)× the length of the sample (unit: m)=340 dB, and the light power of the pump light at a wavelength of 976 nm was set a 400 mW. The loss increase by photodarkening at a wavelength of 810 nm after entering the pump light for 100 min was measured. The measurement results are shown in FIG. 9A and FIG. 9B.

As shown in FIG. 9, it can be seen that as the absorption coefficient per unit length is higher, that is, as the Yb concentration of the optical fiber core portion is higher, the loss increase by photodarkening at a wavelength of 810 nm is higher. Furthermore, as the Al concentration of the optical fiber core portion is higher, the loss increase by photodarkening at a wavelength of 810 nm is lower.

Next, an optical fiber laser was constituted by using the Yb-doped core optical fiber, and subject to laser oscillation over a long period of time, and then the output power of the light at a laser oscillation wavelength of 1060 nm was observed. The optical fiber laser constituted by using the Yb-doped core optical fiber having a loss increase by photodarkening at a wavelength of 810 nm of 0.5 dB or less, the output power of the light at a laser oscillation wavelength of 1060 nm was not substantially reduced even when laser oscillation was carried out over a long period of time. On the other hand, the optical fiber laser constituted by using the Yb-doped core optical fiber having a loss increase by photodarkening at a wavelength of 810 nm of more than 0.5 dB, the output power of the light at a laser oscillation wavelength of 1060 nm was observed to be decreased over time. Furthermore, as the loss increase by photodarkening was higher, the decrease rate of the output power of the light at a laser oscillation wavelength of 1060 nm was higher.

Figure 9B:
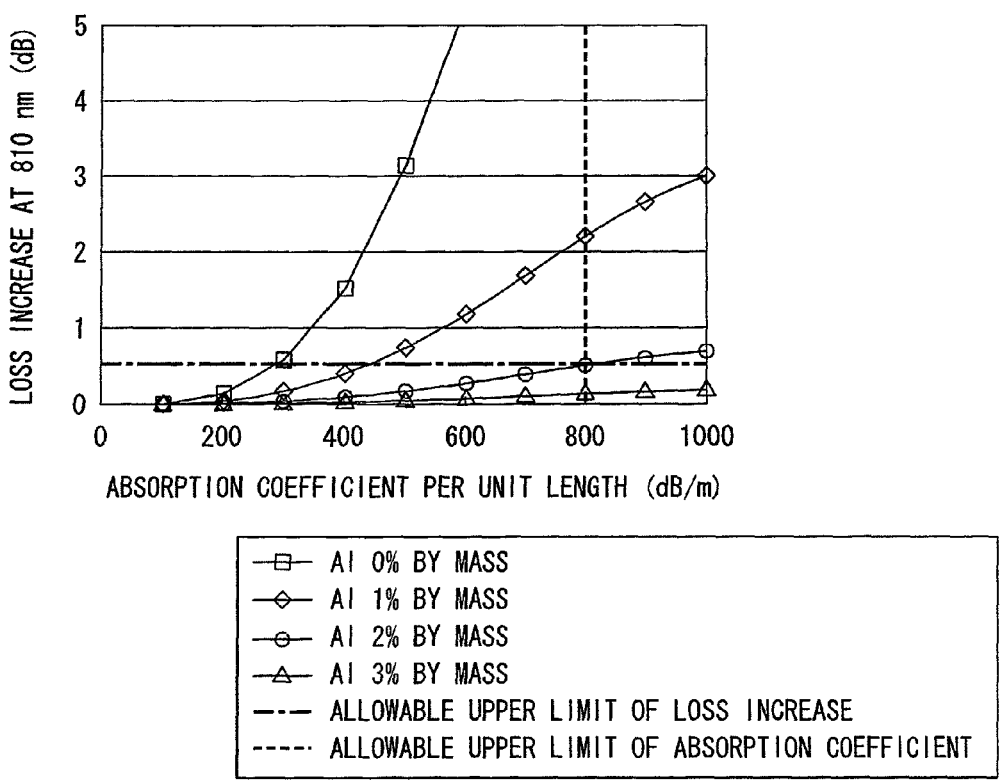
FIG. 9B is a graph showing the results of the loss increase by photodarkening as measured in Example 1.

As clearly shown from FIG. 9B, by constituting the Yb-doped core optical fiber such that the core had an Al concentration of 2% by mass or more, and Yb was contained at such a concentration that a absorption band which appeared around a wavelength of 976 nm showed a peak absorption coefficient of 800 dB/m or less in the absorption band by Yb contained in the core, an Yb-doped core optical fiber having a loss increase by photodarkening at a wavelength of 810 nm of 0.5 dB or less can be obtained.

Example 2

Using the Yb-doped core optical fiber having a structure as shown in FIG. 2B, a plurality of optical fibers having different Yb concentrations in the core were prepared. The absorption varied within the range such that the absorption band which appeared around a wavelength of 976 nm showed the peak absorption coefficient in a range of from 100 dB/m to 1500 dB/m. The prepared Yb-doped core optical fiber had a clad outer diameter of 125 μm, a core diameter of approximately 10 μm, and an Al concentration in the core of 2% by mass. Furthermore, fluorine (F) was also contained in the core, in addition to Al and Yb. The specific refractive index Δ of the core with respect to the clad was about 0.12%.

On the other hand, in Reference Example, using the Yb-doped core optical fiber having a structure as shown in FIG. 2B, a plurality of optical fibers having different Yb concentrations in the core were prepared. The absorption varied within the range such that the absorption band which appeared around a wavelength of 976 nm showed the peak absorption coefficient in a range of from 100 dB/m to 1500 dB/m. This Yb-doped core optical fiber had a clad outer diameter of 125 μm and a core diameter of approximately 10 and had no fluorine in the core. It also had an Al concentration in the core of 1% by mass. The difference Δ in the specific refractive indices of the core from the clad was about 0.12%.

Figure 10:
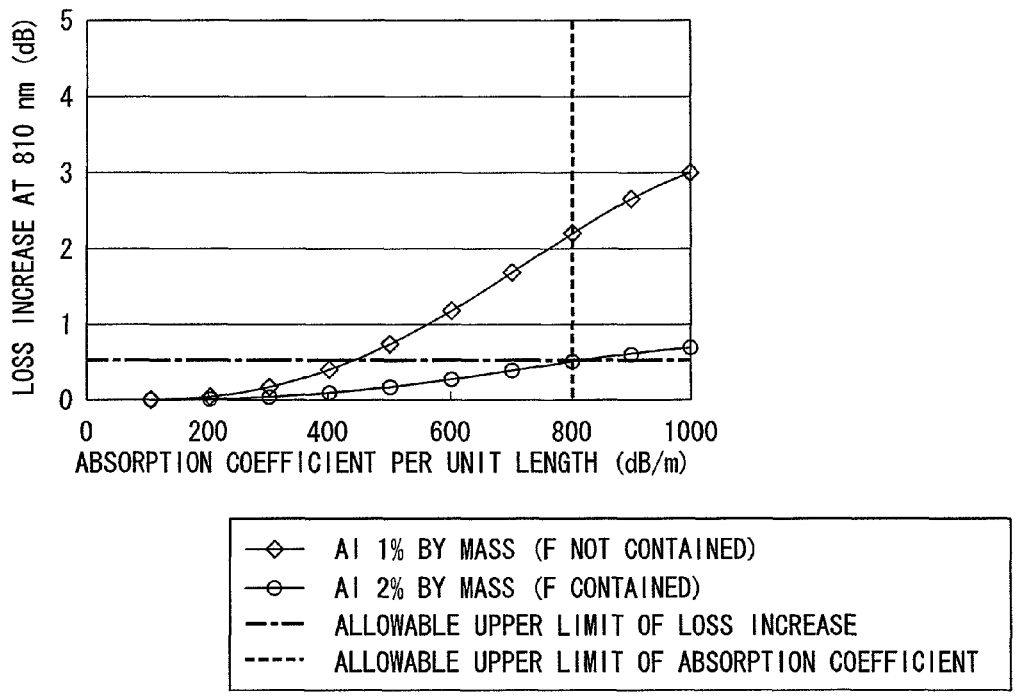
FIG. 10 is a graph showing the results of the loss increase by photodarkening as measured in Example 2.

In a similar manner to Example 1, the loss increase by photodarkening at a wavelength of 810 nm was measured. The results are shown in FIG. 10. As seen from FIG. 10, whether the core contained fluorine or not, having a higher Al concentration in the optical fiber core portion corresponded to a smaller loss increase by photodarkening at a wavelength of 810 nm.

On the other hand, since the specific refractive index Δ of the core with respect to any optical fiber was about 0.12%, the optical characteristics such as the mode field diameter and the cut-off wavelength were the same. Accordingly, by constituting the Yb-doped core optical fiber such that the core had an Al concentration of 2% by mass or more, Yb was contained at such a concentration that an absorption band which appeared around a wavelength of 976 nm showed a peak absorption coefficient of 800 dB/m or less in the absorption band by Yb contained in the core, and fluorine was contained in the core, an Yb-doped core optical fiber having a loss increase by photodarkening at a wavelength of 810 nm of 0.5 dB or less can be obtained, with a small difference Δ in the specific refractive indices of the core.

Example 3

According to the manufacturing method of the rare earth-doped core optical fiber according to the present invention, a Yb-doped core optical fiber was prepared. The prepared optical fiber was a Yb-doped core optical fiber having a structure as shown in FIG. 2B, and a plurality of optical fibers having different Yb concentrations in the core were prepared. The amount of the peak absorption coefficient is varied within the range of from 100 dB/m to 1500 dB/m in the absorption band which appears around a wavelength of 976 nm caused by the Yb concentrations. The prepared Yb-doped core optical fiber had a clad outer diameter of 125 μm, a core diameter of approximately 10 μm, and an Al concentration in the core of 2% by mass. Furthermore, fluorine (F) was also contained in the core, in addition to Al and Yb. The specific refractive index Δ of the core with respect to the clad was about 0.12%. In the manufacturing of the preform of the present Example 3, Al doping was performed in the deposition step as shown in FIG. 4A.

On the other hand, in Reference Example, a Yb-doped core optical fiber was prepared in the same manner as in Example 3, except that Al doping for a preform was performed in the doping step in FIG. 4B. However, in the present Reference Example, the doping step was performed using an aqueous solution containing $AlCl_3$ as an Al compound in addition to the rare earth element compound, which was different from the doping step as shown in FIG. 4B. The Yb-doped core optical fiber of Reference Example, obtained from the preform prepared by this manufacturing method had the same Al concentration (2% by mass), and F and Yb concentrations as the Yb-doped core optical fiber of Example 3, and the specific refractive index of the core was about 0.12%.

Figure 11:
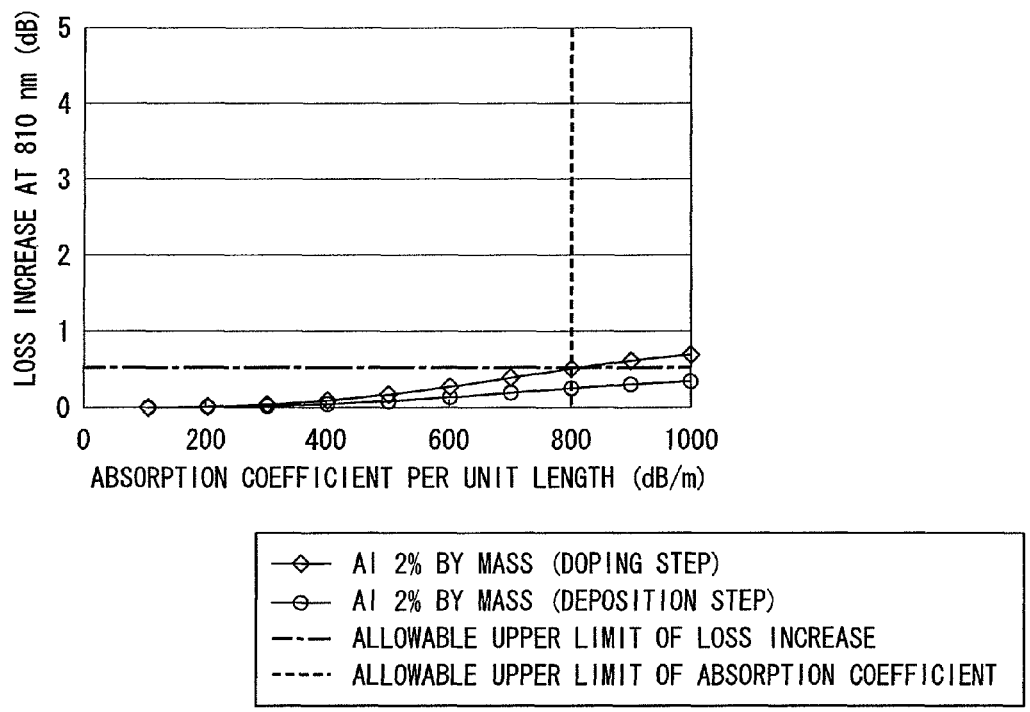
FIG. 11 is a graph showing the results of the loss increase by photodarkening as measured in Example 3.

In a similar manner to Example 1, the loss increase by photodarkening at a wavelength of 810 nm was measured. The results are shown in FIG. 11.

In any of the optical fibers, the Al concentration in the core was 2% by mass, and the loss increase by photodarkening at a wavelength of 810 nm was sufficiently small, but there were differences according to the manufacturing methods. The optical fiber Example 3 in which the Al doping was performed in the deposition step as shown in FIG. 4A had a smaller loss increase by photodarkening than the optical fiber of Reference Example in which the Al doping was performed in the doping step as shown in FIG. 4B.

Example 4

Here, the method for deriving the inequality (A) is described.

Figure 12:
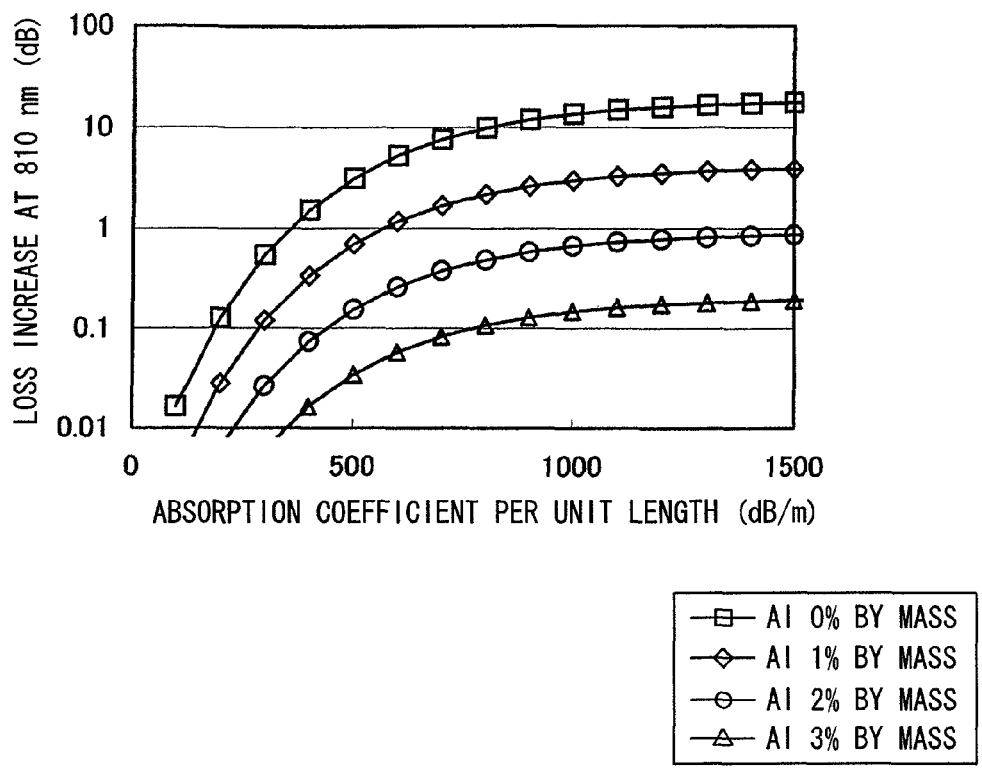
FIG. 12 is a graph showing the results of the loss increase by photodarkening as measured in Example 4.

For the measurement results of the loss increase by photodarkening the Yb-doped core optical fiber in Example 1, we tried to express the relationship between the absorption coefficient and the concentration of aluminum contained in the core by an empirical equation. The data in FIG. 9 was used to determine the empirical equation. Logarithmic expression of the loss increase at 810 nm of FIG. 9A is shown in FIG. 12. The curve in FIG. 12 approximates an exponential function, and can be expressed by the following empirical equation (1).

$$\log(L_{PD}) = C_0 - C_1 * \exp\{-C_2 * (A_{Yb})\} \tag{1}$$

wherein $L_{PD}$ is a loss increase by photodarkening at a wavelength of 810 nm (unit: dB), and $A_{Yb}$ is an absorption coefficient per unit length (unit: dB/m). $C_0$, $C_1$, and $C_2$ are fitting factors. For the data of each Al concentration in FIG. 12, the empirical equation (1) was used for each fitting. For best fit, the fitting factors, $C_0$, $C_1$, and $C_2$ were adjusted for fitting. For each Al concentration, $C_0$, $C_1$, and $C_2$ were determined, as shown in Table 2.

TABLE 2

| | Fit factor obtained from empirical equation (1) | | |
|---|---|---|---|
| | Fit factors | | |
| Al concentration | $C_0$ | $C_1$ | $C_2$ |
| Al 0% by mass | 1.274 | 4.352 | 0.00347 |
| Al 1% by mass | 0.618 | 4.256 | 0.00337 |
| Al 2% by mass | −0.037 | 4.403 | 0.00353 |
| Al 3% by mass | −0.692 | 4.206 | 0.00335 |
| Average value | | 4.304 | 0.00343 |

As shown in Table 2, it is found that the fitting factors $C_1$ and $C_2$ give almost the same values even under different Al concentrations, whereas the fitting factor $C_0$ varies depending on the Al concentration. Since the fitting factors $C_1$ and $C_2$ are substantially not changed depending on the Al concentrations, the average values of $C_1$ and $C_2$ obtained from each Al concentration, $C_1$=4.304 and $C_2$=0.00343 were substituted into the empirical equation (1), thereby obtain the following empirical equation (2).

$$\log(L_{PD}) = C_0 - 4.304 * \exp\{-0.00343 * (A_{Yb})\} \tag{2}$$

It is expected that the fitting factor $C_0$ is variable depending on the Al concentration.

Figure 13:
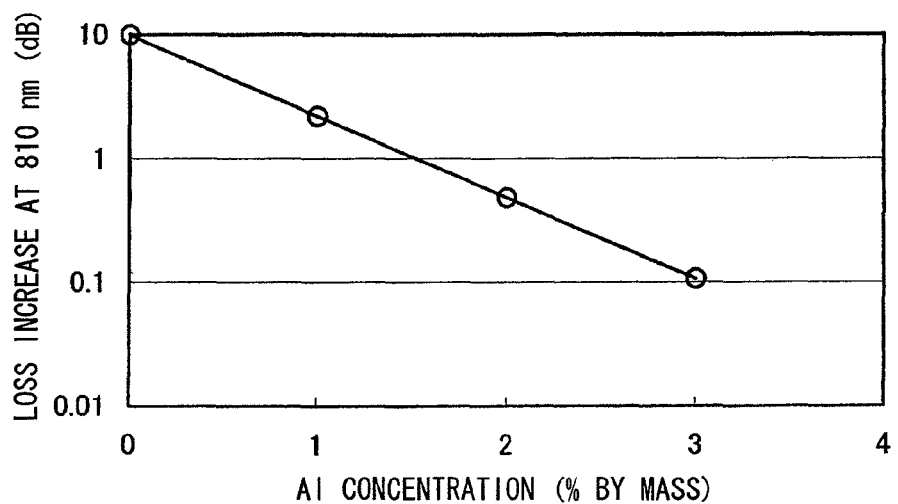
FIG. 13 is a graph showing the relationship between the loss increase by photodarkening and the Al concentration at an absorption coefficient of 800 dB/m.

Next, in the data shown in FIG. 12, the relationship between the loss increases due to photodarkening at a wavelength of 810 nm and the Al concentrations was investigated in consideration of the absorption coefficient per unit length of 800 dB/m. FIG. 13 shows the relationship between the loss increases at 810 nm and the Al concentrations. FIG. 13 has a logarithmic expression of the loss increase at 810 nm. FIG. 13 shows the linear relationship between the logarithmic values of the loss increase at 810 nm and the Al concentrations, thereby it being expressed by the following empirical equation (3).

$$\log(L_{PD}) = -0.655 * (D_{Al}) + 0.997 \tag{3}$$

wherein $D_{Al}$ is an Al concentration in the core (unit: % by mass).

Since the empirical equation (3) is an equation derived only from the data in a case where the absorption coefficient per unit length is 800 dB/m, 800 dB/m is substituted into $A_{Yb}$ in the empirical equation (2), thereby obtaining the following equation (4).

$$\log(L_{PD}) = C_0 - 0.277 \tag{4}$$

By substituting the equation (4) into the equation (3), the following equation (5) was obtained.

$$C_0 = -0.655*(D_{Al}) + 1.274 \quad (5)$$

By substituting the equation (5) into the equation (2), the following equation (6) was obtained.

$$\log(L_{PD}) = -0.655*(D_{Al}) - 4.304*\exp\{-0.00343*(A_{Yb})\} + 1.274 \quad (6)$$

By modifying the equation (6), the following equation (7) was obtained.

$$L_{PD} = 10^{\{-0.655*(D_{Al}) - 4.304*\exp\{-0.00343*(A_{Yb})\} + 1.274\}} \quad (7)$$

Therefore, the equation (7) is an empirical equation showing the relationship between the absorption coefficients and the aluminum concentrations contained in the core, for the measurement results of the loss increase by photodarkening. If a measured value of the loss increase by photodarkening, $L_{PD}$, is no more than an allowable loss increase by photodarkening, $T_{PD}$, as described above, that is, in the case of the following inequality (8):

$$T_{PD} \geq L_{PD} \quad (8)$$

the optical fiber laser obtained using this Yb-doped core optical fiber would have good characteristics.

From the equation (7) and inequality (8), the inequality (A) is derived.

$$T_{PD} \geq 10^{\{-0.655*(D_{Al}) - 4.304*\exp\{-0.00343*(A_{Yb})\} + 1.274\}} \quad (A)$$

As shown in Examples 1 and 2, the optical fiber laser constituted by using the Yb-doped core optical fiber having a loss increase by photodarkening of 0.5 dB or less, the output power of the light at a laser oscillation wavelength of 1060 nm was substantially reduced, even when laser oscillation was carried out over a long period of time. In order to obtain such the Yb-doped core optical fiber, by using the inequality (B) obtained by setting an allowable loss increase by photodarkening in the inequality (A) to $T_{PD}=0.5$ dB, the absorption coefficients and the aluminum concentrations should satisfy the relationship in this inequality.

$$0.5 \geq 10^{\{-0.655*(D_{Al}) - 4.304*\exp\{-0.00343*(A_{Yb})\} + 1.274\}} \quad (B)$$

To confirm the effect of the inequality (B), using the Yb-doped core optical fiber having a structure as shown in FIG. 2A, 9 kinds of fibers having different Al concentrations in the core and absorption coefficients were prepared. The Al concentration and the absorption coefficient of each fiber are shown in Table 3.

TABLE 3

List of Yb-doped core optical fibers prepared

| Kind of fiber | Optical fiber | Yb light absorption rate (dB/m) | Al concentration (% by mass) | Empirical equation (8) satisfied or not | Measured loss increment at 810 nm (dB) |
|---|---|---|---|---|---|
| Fiber of Comparative Example | Sample A | 600 | 1.11 | X | 1.00 |
| Fiber of the present invention | Sample B | 600 | 1.57 | ○ | 0.50 |
| Fiber of the present invention | Sample C | 600 | 1.9 | ○ | 0.30 |
| Fiber of Comparative Example | Sample D | 800 | 1.52 | X | 1.00 |
| Fiber of the present invention | Sample E | 800 | 1.98 | ○ | 0.50 |
| Fiber of the present invention | Sample F | 800 | 2.32 | ○ | 0.30 |
| Fiber of Comparative Example | Sample G | 1000 | 1.73 | X | 1.00 |
| Fiber of the present invention | Sample H | 1000 | 2.19 | ○ | 0.50 |
| Fiber of the present invention | Sample I | 1000 | 2.53 | ○ | 0.30 |

For the samples, A, B, and C, the absorption coefficients are all 600 dB/m, but the Al concentrations are different from each other. For the samples, D, E, and F, the absorption coefficients are all 800 dB/m, but the Al concentrations are different from each other. For the samples, G, H, and I, the absorption coefficients are all 1000 dB/m, but the Al concentrations are different from each other. In Comparative Examples, if the absorption coefficient and the Al concentration of each of the samples, A, D, G are substituted into the inequality (B), the right hand side of the inequality (B) is more than 0.5 in any of the fibers, and accordingly it does not satisfy the condition of the inequality (B). On the other hand, the samples, B, C, E, F, H, and I, that are the optical fibers of the present invention, all satisfy the condition of the inequality (B).

In a similar manner to Example 1, for the Yb-doped core optical fibers of the samples A through I, the loss increase by photodarkening at a wavelength of 810 nm was measured. The results are shown in Table 3. As seen from Table 3, the samples, B, C, E, F, H, and I, that are the optical fibers of the present invention, all have a loss increase by photodarkening of 0.5 dB or less. On the other hand, the samples, A, D, and G in Comparative Examples, all had a loss increase by photodarkening of more than 0.5 dB.

As clearly seen from Table 3, by doping aluminum and ytterbium in the core such that the concentration of aluminum contained in the core, and the peak absorption coefficient of the absorption band which appears at a wavelength of 976 nm in the absorption band by ytterbium contained in the core satisfy the inequality (B), it is possible to obtain an Yb-doped core optical fiber having a loss increase by photodarkening at a wavelength of 810 nm of 0.5 dB or less.

The invention claimed is:

1. A rare earth-doped core optical fiber comprising: a core which comprises a silica glass containing at least aluminum and ytterbium; and a clad provided around the core and comprising a silica glass having a lower refraction index than that of the core, wherein aluminum and ytterbium are doped into the core such that a loss increase by photodarkening, $T_{PD}$, satisfies the following inequality (A):

$$T_{PD} \geq 10^{\{-0.655*(D_{Al})-4.304*exp\{-0.00343*(A_{Yb})\}+1.274\}} \quad (A)$$

wherein $T_{PD}$ represents an allowable loss increase by photodarkening at a wavelength of 810 nm (unit: dB), $D_{Al}$ represents the concentration of aluminum contained in the core (unit: % by mass), and $A_{Yb}$ represents the peak absorption coefficient of the absorption band which appears around a wavelength of 976 nm in the absorption band by ytterbium contained in the core (unit: dB/m), wherein $T_{PD}$ is 0.5 dB or less, and wherein the core includes no other dopant that increases the refractive index except for rare earth dopants.

2. The rare earth-doped core optical fiber according to claim 1, wherein the core has an aluminum concentration of 2% by mass or more, and ytterbium is doped into the core at such a concentration that the absorption band of ytterbium doped into the core which appears around a wavelength of 976 nm shows a peak absorption coefficient of 800 dB/m or less.

3. The rare earth-doped core optical fiber according to claim 2, wherein the core further contains fluorine.

4. The rare earth-doped core optical fiber according to claim 1, wherein a polymer layer having a lower refraction index than that of the clad is provided on the outer periphery of the clad.

5. The rare earth-doped core optical fiber according to claim 4, wherein the clad is composed of an inner clad positioned on the exterior of the core, and an outer clad positioned outside the inner clad, and the refractive index n1 of the core, the refractive index n2 of the inner clad, the refractive index n3 of the outer clad, and the refractive index n4 of the polymer layer satisfy the relationship of n1>n2>n3>n4.

6. The rare earth-doped core optical fiber according to claim 1, wherein air holes are present in a part of the clad glass.

7. A rare earth-doped core optical fiber comprising: a core which comprises a silica glass containing at least aluminum, ytterbium, and fluorine; and a clad provided around the core and comprising a silica glass having a lower refraction index than that of the core, wherein aluminum and ytterbium are doped into the core such that a loss increase by photodarkening, $T_{PD}$, satisfies the following inequality (A):

$$T_{PD} \geq 10^{\{-0.655*(D_{Al})-4.304*exp\{-0.00343*(A_{Yb})\}+1.274\}} \quad (A)$$

wherein $T_{PD}$ represents an allowable loss increase by photodarkening at a wavelength of 810 nm (unit: dB), $D_{Al}$ represents the concentration of aluminum contained in the core (unit: % by mass), and $A_{Yb}$ represents the peak absorption coefficient of the absorption band which appears around a wavelength of 976 nm in the absorption band by ytterbium contained in the core (unit: dB/m), wherein $T_{PD}$ is 0.5 dB or less, and wherein the core includes no other dopant that increases the refractive index except for rare earth dopants.

* * * * *